July 24, 1962  L. WHITCOMB  3,045,368
APPARATUS FOR DIGGING AND BALLING TREES OR BUSHES
Filed April 14, 1960  7 Sheets-Sheet 1
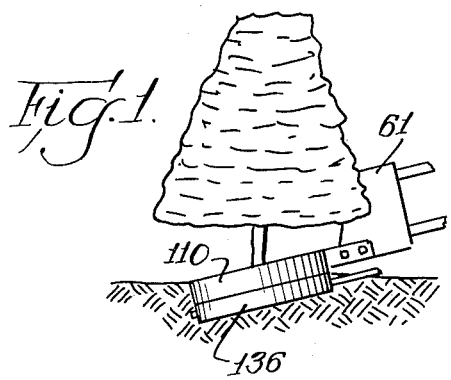
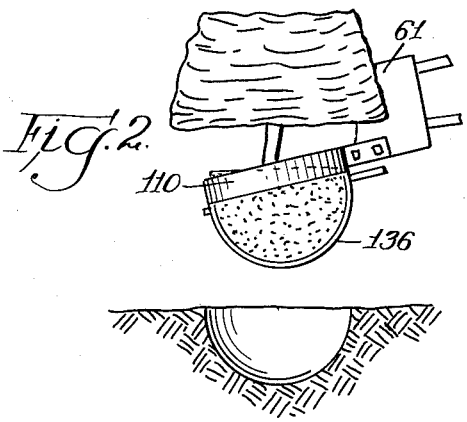
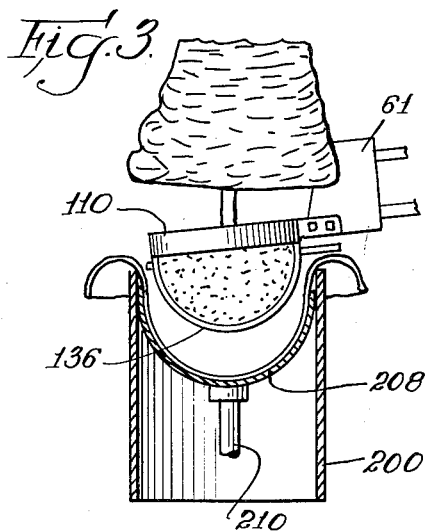
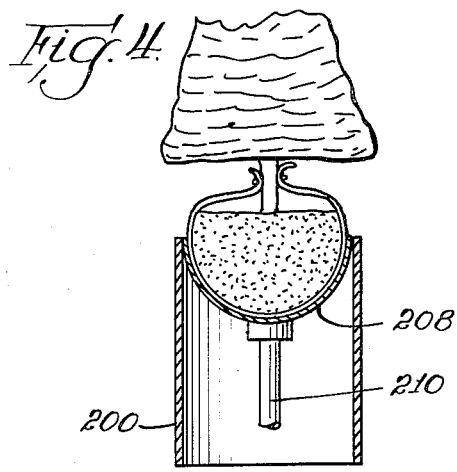
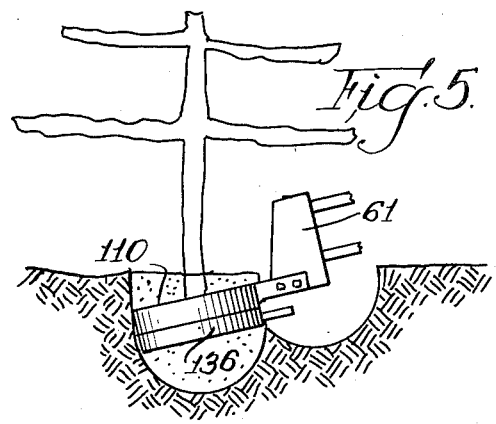
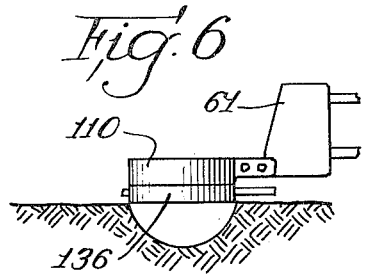
INVENTOR.
Lee Whitcomb
BY Harry H. Hitzman
ATTY.

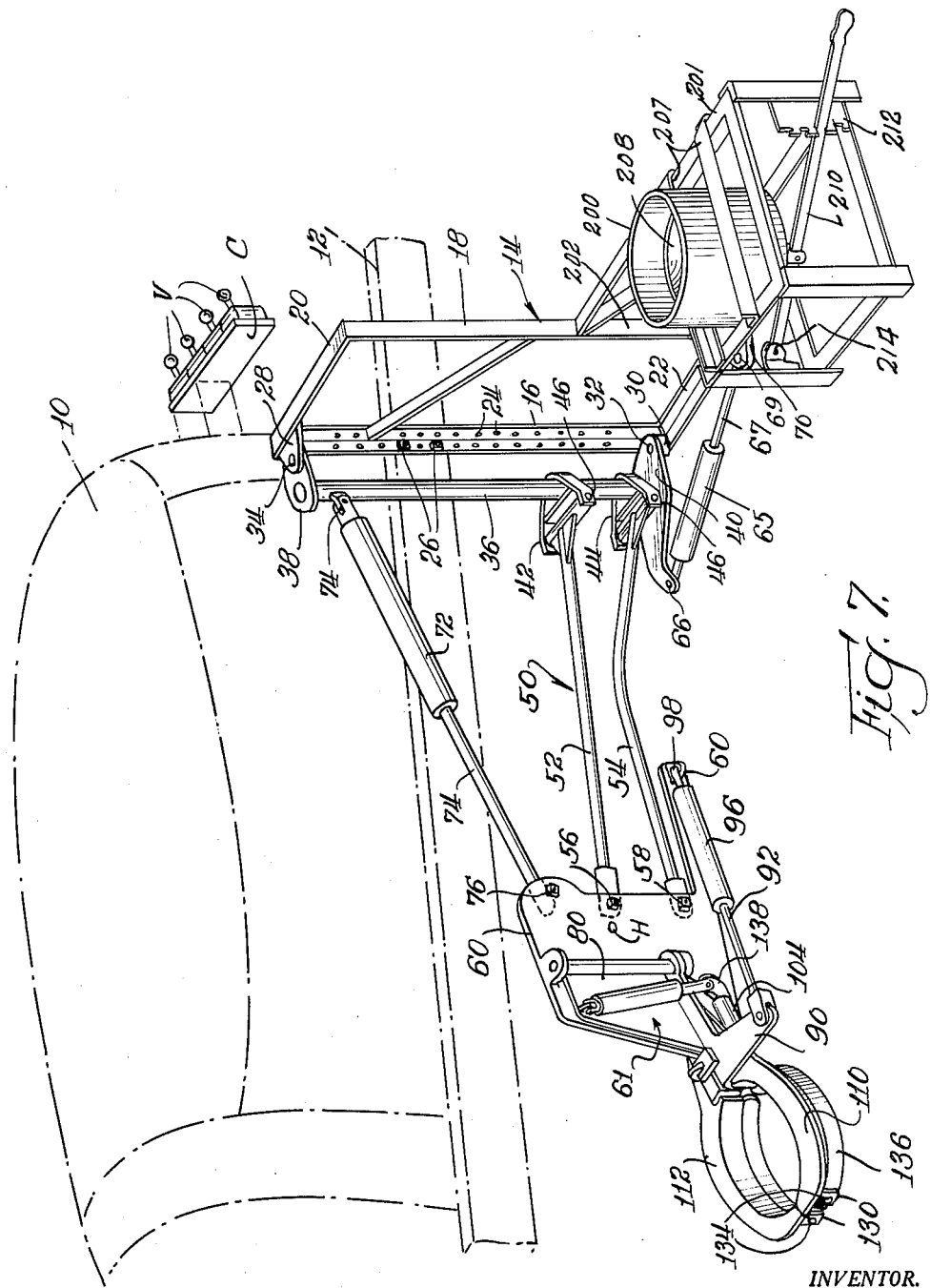

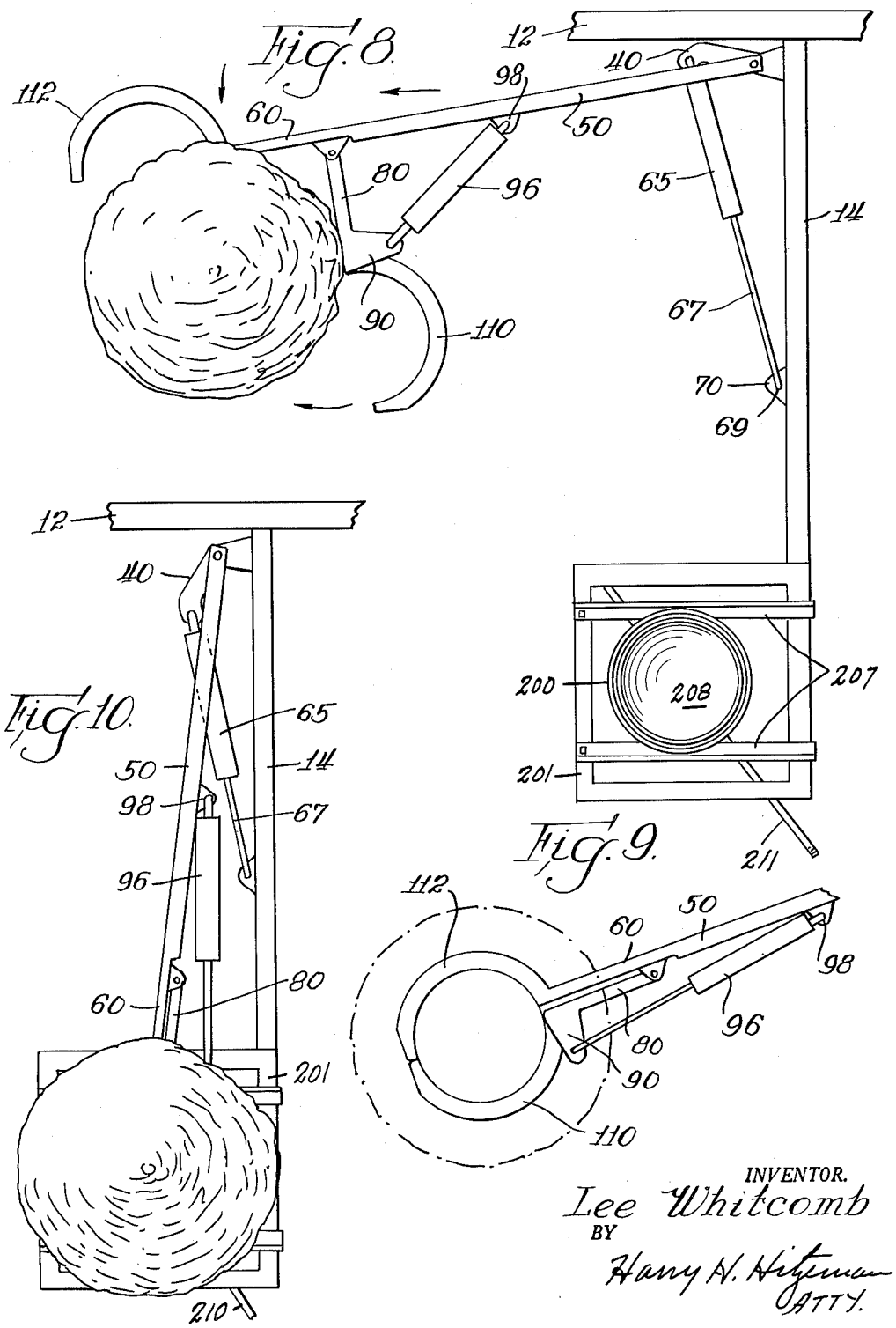

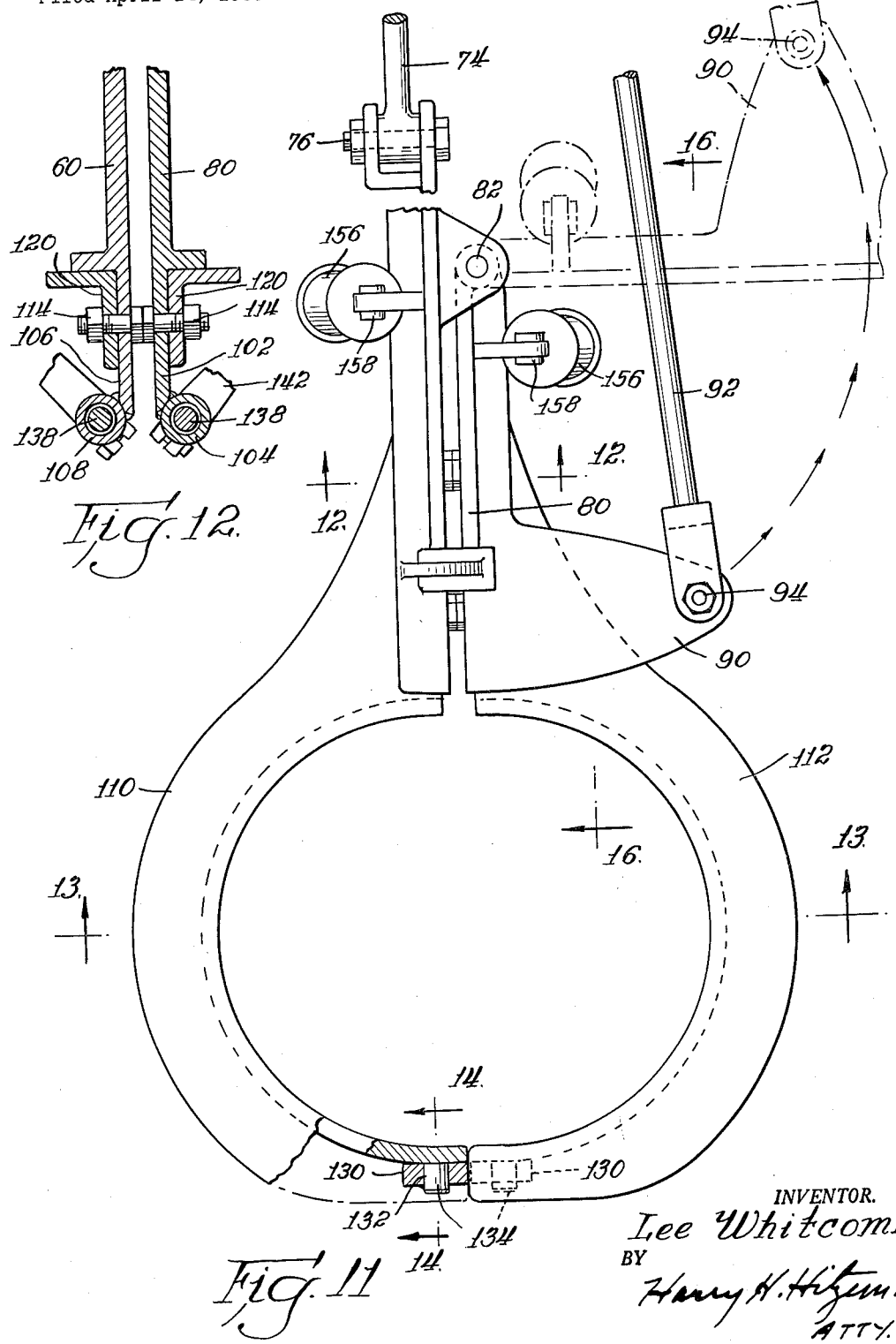

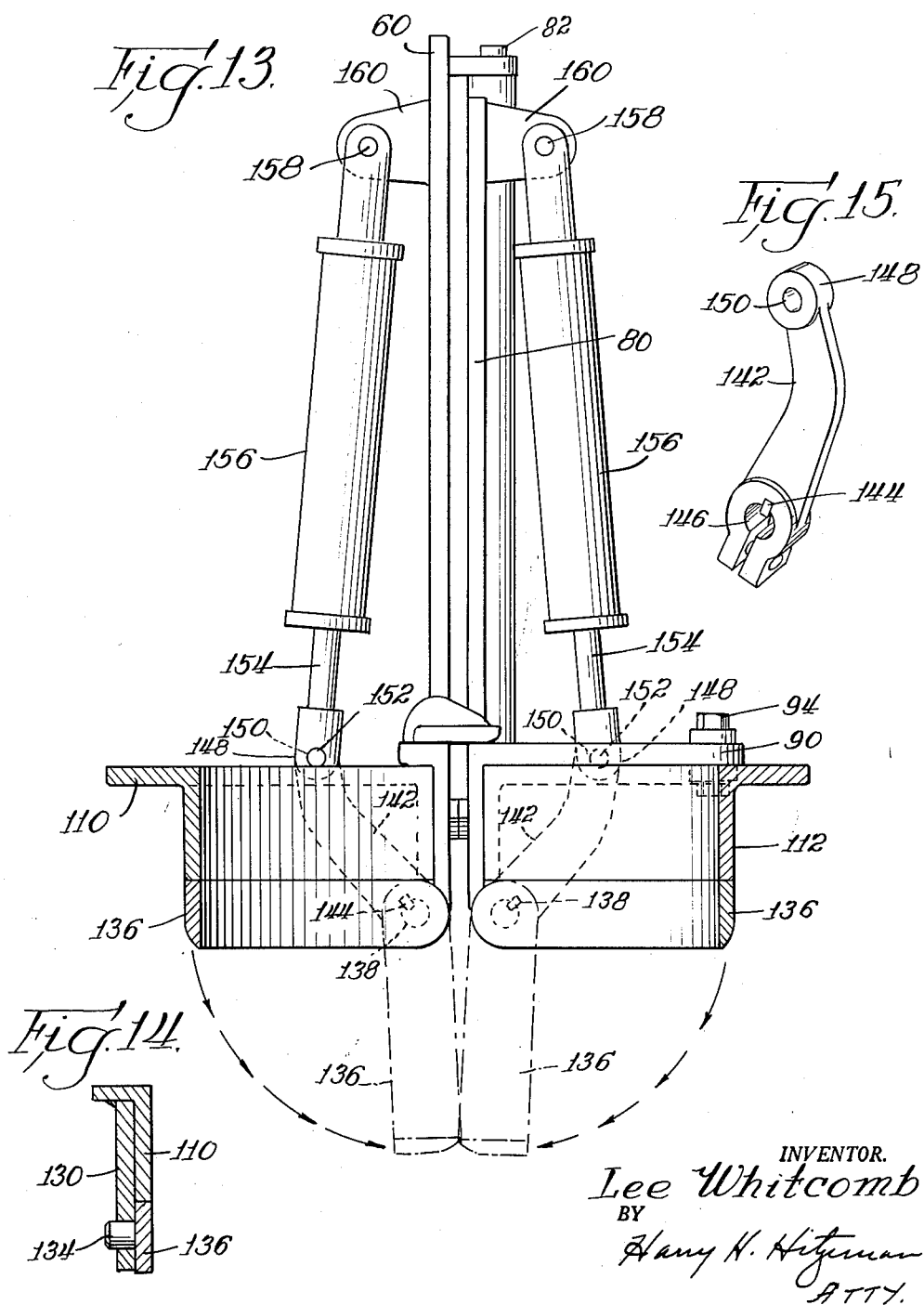

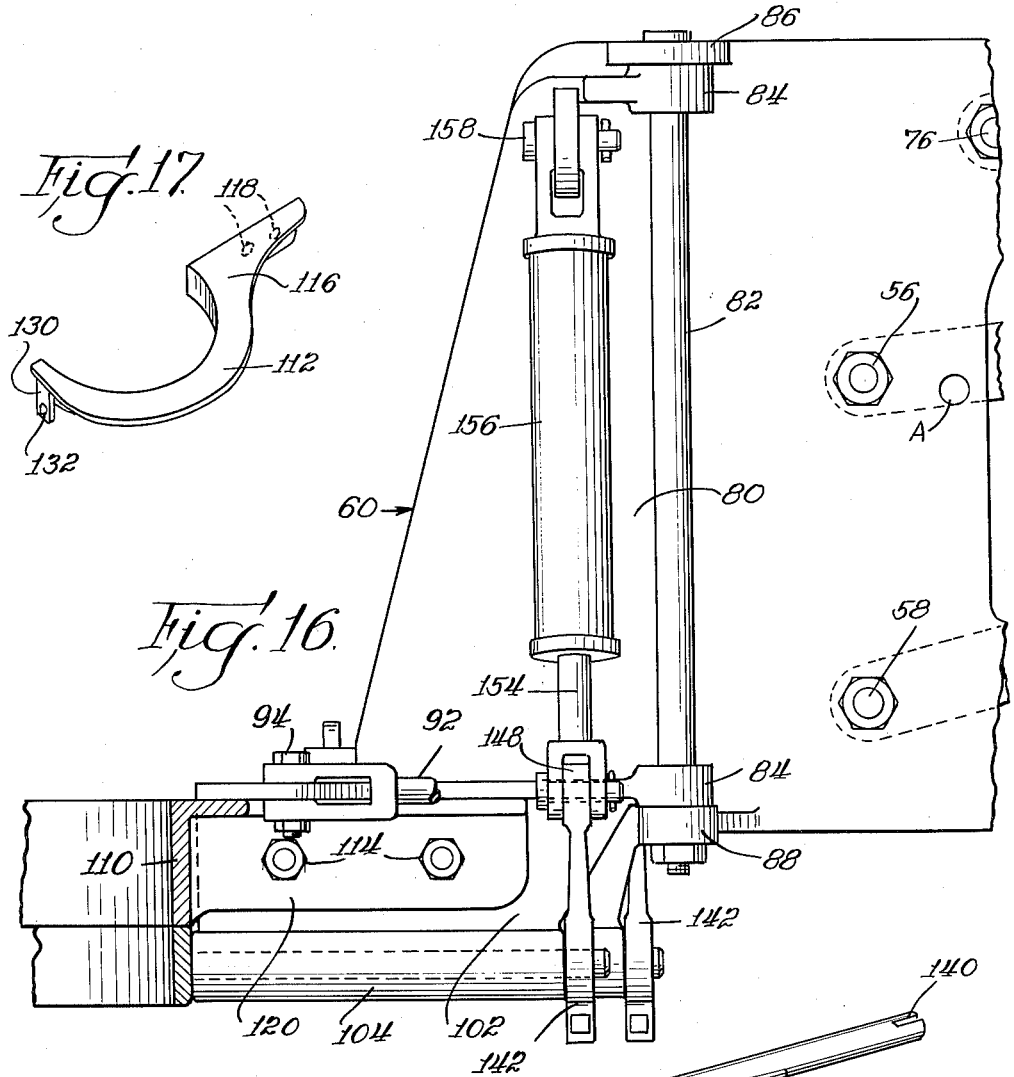

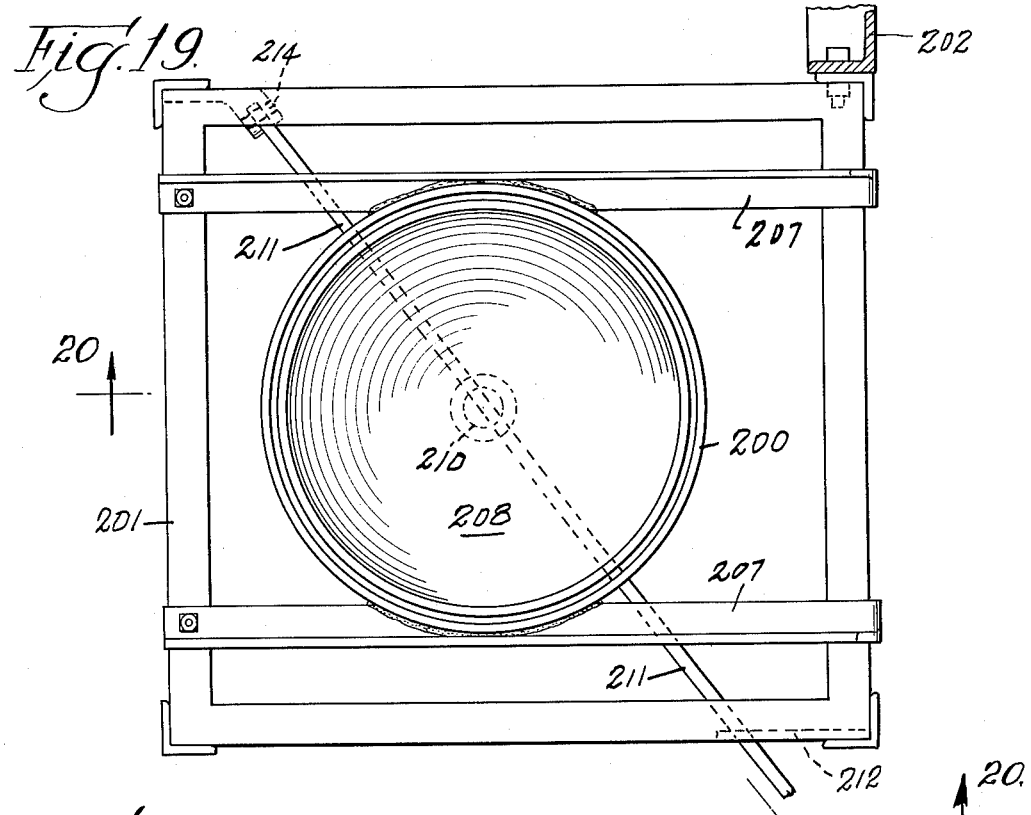
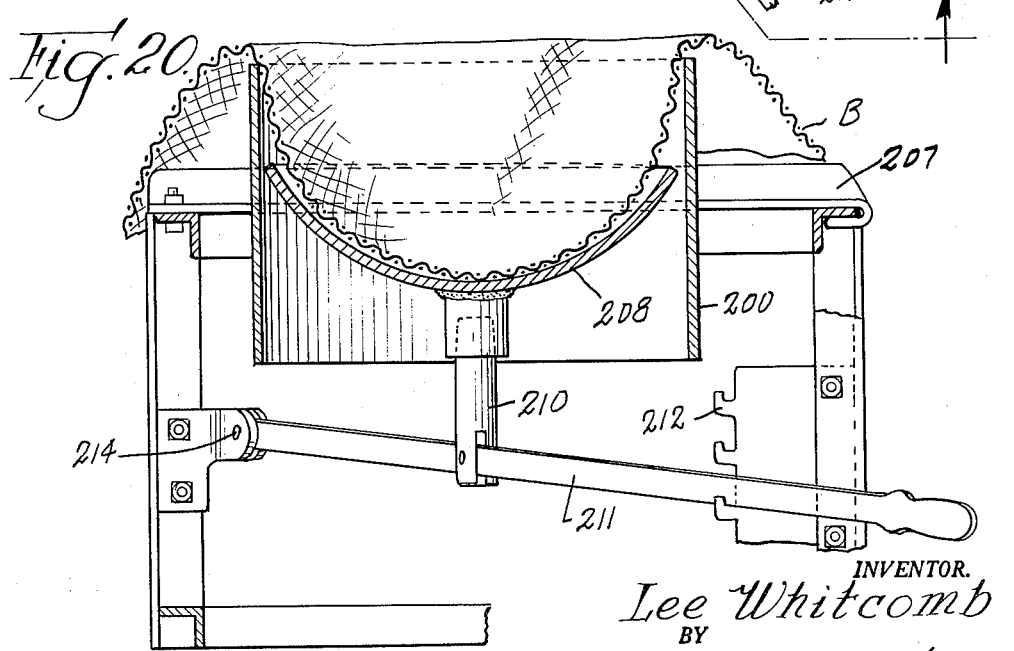

United States Patent Office 3,045,368
Patented July 24, 1962

3,045,368
APPARATUS FOR DIGGING AND BALLING
TREES OR BUSHES
Lee Whitcomb, 719 Illinois St., Plainfield, Ill., assignor to Robert Whitley, Joliet, Ill., and himself
Filed Apr. 14, 1960, Ser. No. 22,279
14 Claims. (Cl. 37—2)

My invention relates to a method of digging, balling and burlapping bushes or trees, and also to an improved apparatus for carrying out said method.

In providing trees and bushes for landscaping, the nursery men are usually required to dig out and deliver to the new location the shrubbery and trees which are desired for transplanting. This is done by digging out the earth in a circular area around the trunk or base to a depth so that the major portions of the roots of the bush or tree are retained within the soil or ground, and an effort is made to deliver the bush or tree without losing this ground immediately surrounding the trunk or base of the tree or bush. This is usually effected by placing the base of the tree or bush together with the ground or soil on a burlap sheet or into a burlap bag, and then tying the same up around the trunk or base to prevent the ground from becoming loose during handling and falling away from the roots. This process is generally known in the trade as "balling and burlapping."

Where a large number of trees or bushes are to be removed at a specific time from the nursery for transplanting, the labor involved in carrying out the above operations makes the removal and delivery of the trees or bushes a comparatively slow and drawn out process.

The principal object of the present invention is to provide an improved method for removing or balling a bush or tree with mechanism capable of moving a pair of semi-cylindrical knife supporting members around the base of a bush or tree, closing the same to form a circular downwardly pointing knife assembly, and then causing both of the semi-circular knives to swing transversely in an arc of 90° to cut down and around the roots of the bush or tree, and loosening the soil and roots in an area in the form of a half sphere, lifting the bush or tree together with this half sphere or ball of earth and depositing the same in a holder upon a burlap sheet so that the burlap sheet can be raised over the surface of the ball for fastening together around the base or trunk of the bush or tree.

A further object of the invention is to provide a method of the type above described whereby an operator can control the unit which includes the cutter head for cutting out the ball and raise the ball and bush or tree and swing it around to a suitable position where the burlap, cloth or sack may be attached.

A further object of the present invention is to provide mechanism for removing a tree or bush for replanting by cutting a ball of earth or soil about the base of the tree and raising and swinging the same to a position where the cutter and support may be released and the bush or tree may be burlapped.

A further object of the invention is to provide mechanism of the type described which may be mounted upon a movable vehicle and be operated by hydraulic cylinders receiving their power from a hydraulic power source on the vehicle.

A further object of the invention is to provide apparatus of the type described which may be operated either upon the side or from the back of a movable vehicle that has a source of hydraulic power thereon.

A further object of the invention is to provide apparatus of the class described which has a pair of cutter heads that are semi-cylindrical and which may be swung apart to move both halves of the cutters beyond the trunk or base of a tree or bush, close the same to form a circular cutting area around the base, and other mechanism for swinging the semi-circular blades of the cutters downwardly in an arc of 90° to cut out a section of earth that is generally semi-spherical.

A further object of the invention is to provide apparatus of the class described which is provided with a central control positioned adjacent the operator of the vehicle upon which it is mounted and which may be controlled by the operator of the vehicle.

Other objects and advantages will be more apparent from the following description wherein reference is had to the accompanying drawings, upon which:

FIG. 1 is a side elevational view showing a boom carrying a pair of semi-cylindrical cutter plates in position for cutting out a hemisphere or ball of earth surrounding the roots of a bush or tree;

FIG. 2 shows the same in a side elevational view to show the boom in a raised position and the knives in an extreme cutting position supporting the ball and bush for movement to a holder where the burlap is applied;

FIG. 3 shows the bush and ball being held in position for trimming and applying the burlap;

FIG. 4 is a similar side elevtational view showing the burlap after being applied and stapled around the trunk of the bush or tree;

FIG. 5 is a side elevational view similar to FIG. 1, showing the gouging out of a portion of the earth before the balling operation so that a larger ball may be dug out;

FIG. 6 is a similar side elevation showing how the boom and cutter head may be horizontally disposed to cut out a smaller ball, as when a small bush is being removed for transplanting;

FIG. 7 is a side perspective view of the apparatus shown attached to one of the side frames of a tractor, with the cutter heads, knives and associated parts to the left of the view and the cup-shaped ball receiving holder and mechanism to the right;

FIG. 8 is a generally schematic plan view showing the knife holders in open position for engagement under the branches about the trunk of a tree;

FIG. 9 is a diagrammatic fragmentary plan view showing the knife holders and knives in closed position about the trunk of the tree;

FIG. 10 is a diagrammatic plan view showing a changed position of the boom and balling mechanism swung about to the right for disposition of the ball in the cup-shaped holder;

FIG. 11 is an enlarged fragmentary plan view of the knife holders and associated mechanism with portions broken away to more clearly show other parts, and the knife holder and actuating member shown swung to the right in an open position in dotted lines;

FIG. 12 is a fragmentary cross-sectional view through the pivots for the knives, taken generally on the line 12—12 of FIG. 11;

FIG. 13 is a cross-sectional view through the knife holder and knives and operating mechanism, and is taken generally on the line 13—13 of FIG. 11;

FIG. 14 is a transverse sectional view of one of the knife holders and knives, taken on the line 14—14 of FIG. 11;

FIG. 15 is a generally front perspective view of one of the knife arms;

FIG. 16 is a fragmentary side elevational view of the knife holder support plate and associated parts, with parts broken in section;

FIG. 17 is a top perspective view of one of the knife holders;

FIG. 18 is a similar top perspective view of one of the knives;

FIG. 19 is a plan view of the ball holding and burlapping mechanism shown at the right of the machine; and FIG. 20 is a cross-sectional view therethrough taken generally on the line 20—20 of FIG. 19.

In the embodiment of the invention which I have chosen to illustrate and describe the same, I have shown in FIG. 7 in dot-dash lines, a wheeled vehicle such as a tractor 10 having the usual channel member 12 on the side of the same to which the tree balling apparatus may be attached.

This apparatus may consist of a support frame 14 which may include a framework having vertical angle members 16 and 18 and connecting top and bottom angle members 20 and 22. The angle member 16 is provided with a plurality of bolt holes 24 for the reception of fastener members 26, the bolt holes extending generally throughout the length of the angle members so that the location of the apparatus above the ground may be varied to suit conditions.

The supporting frame 14 may have a pair of horizontally disposed brackets 28 and 30 extending forward therefrom and having pivot pins 32 and 34 therein. A boom post 36 has a top plate 38 and a bottom plate 40 pivotally connected on the pivots 32 and 34 so that the post and plates may swing about throughout a limited arc. The boom post 36 may have a pair of brackets 42 and 44 securely attached on the boom post in spaced relation, each of the brackets having a pivot 46 for one end of a parallelogram boom 50.

The boom 50 consists of a pair of generally parallel rods 52 and 54 connected by suitable pivots 56 and 58 to the vertical plate 60 of a cutter head assembly 61. It will be noted that the pivot pin 56 may be located in either of two openings marked H and A, the openings being so arranged that in one opening the knife head will be disposed at an angle and in the other opening the knife head will be held horizontally, as will be hereinafter more clearly apparent.

The connecting rod 54 is also bent upwardly between its two pivots to clear a cylinder 65, the cylinder connected at one end on a pivot pin 66 to the lower boom post plate 40, and the piston rod 67 therein being connected to a pivot 69 on a stationary support plate 70 at the lower end of the vertical upright 18. Thus when hydraulic force is delivered to either end of the cylinder 65, the boom post and boom 50 together with the cutter head assembly will be swung to the right or to the left under the control of the operator seated on the tractor.

Mechanism for raising or lowering the cutter head assembly may also consist of a hydraulic cylinder 72 pivotally connected at 74 to the boom post 36 and having a piston rod 74 pivotally connected at 76 to the cutter head assembly 61. Thus when fluid under pressure is introduced in either end of the hydraulic cylinder 72, it will pull the piston 74 in or push it out, thus raising or lowering the cutter head assembly 61.

Mechanism has thus far been described which will swing a boom supporting a cutter head assembly either to the right or left in a circular horizontal arc, or up and down in a vertical arc within the limits desired and depending of course upon the length of the hydraulic cylinders which are used.

The cutter head assembly may include generally the vertically disposed support plate 60 to which the parallelogram rods are attached, and an auxiliary plate 80 that has a pair of bosses 84 at its top and bottom ends through which an elongated pivot pin 82 is directed, the pin 82 being mounted in lugs 86 and 88 adjacent the top and bottom ends of the plate 60.

The auxiliary plate 80 may also have a transverse arm 90 adjacent its bottom end, the arm 90 having a connecting rod 92 pivotally fastened thereto by the pivot bolt 94. The connecting rod 92 forms a piston rod in the hydraulic cylinder 96 which is pivotally connected on a pivot 98 in a backwardly extending arm portion of the plate 60.

The auxiliary plate 80 has a downwardly extending leg 102 which carries an elongated bearing 104 adjacent its lower end. The plate 60 may also have a downwardly extending ledge 106 which carries an elongated bearing 108 adjacent its lower end. A pair of generally semi-cylindrically shaped knife holders 110 and 112 may be fastened by sets of bolt members 114 to extensions 102 and 106, the knife holders each having a backwardly extending arm portion 116 which is in the shape of an angle, the bolts 114 passing through suitable openings 118 in the vertical walls 120 of the same.

In this way a semi-cylindrically shaped knife holder is fastened to both the plate 60 and the auxiliary plate 80, and when the auxiliary plate 80 is swung about its pivot 82, as when in dotted lines in FIG. 11, the knife holder 112 may be swung outwardly away from the knife holder 110, permitting the cutter head assembly to be moved inwardly around the base of a tree or bush. Thus, when it is closed, the trunk of the tree or base of the bush will be surrounded by a generally circular enclosure.

Each of the knife holders carries at its extended end a downwardly depending strap 130 having an opening 132 therethrough to receive a pivot pin 134 at the extended end of a generally semi-cylindrically shaped knife blade 136. The knife as shown in FIG. 18 also has an elongated rod 138 extending outwardly from the opposite end of the semi-cylindrical knife and in alignment with the pin 134. The rods 138 may extend through the bearings 104 and 108 and are each provided with an end slot 140. An operating arm 142 for swinging the knives through a 90° arc may be connected on the ends of the rods 138, the arm having a key 144 which engages in the slot 140 and a bore 146 to receive the rod 138.

The arm 142 may extend outwardly and upwardly from the rods 138 and have a boss 148 with a bore 150 therethrough. The bore 150 carries a pivot pin 152 to connect the end of a piston rod 154 to the arms 142. The piston rods 154 extend into hydraulic cylinders 156 which are pivotally connected at 158 to a pivot on a lug 160 extending outwardly from both the plates 60 and 80.

Thus when the plates are together as shown in FIGS. 7 and 13, when hydraulic pressure is placed in the upper ends of the cylinders 156, the rods 154 will be moved outwardly, thus swinging the arms 142 around the rods 138 and rotating these rods and the cutter knives 136 connected thereto so that a generally semi-spherical cut is made downwardly through the earth. When the cutter blades are at the lowermost position shown in dotted lines in FIG. 13, the cutter head is raised by the piston 74 and the unit may then be swung about in an arc to place the balled tree in a desired location.

A control box C may be located on the tractor 10 provided with the usual valve handles V for controlling the flow of hydraulic fluid to the desired cylinder and to the desired end of the same, each of the valves being of the type that will move the piston from either end of the cylinder or hold the same in any desired intermediate or end position, as is well known in the art.

In the embodiment of the invention shown, I prefer to provide a ball receiving unit where the ball may be easily and quickly fastened in a burlap bag or cloth for delivery. This unit may include a generally rectangularly shaped framework 201 which may be supported by an angle 202 and diagonal brace from the support frame 14. It may include an open ended cylinder 200 within which a cup-shaped ball holder 208 is mounted for reciprocal movement. The cup-shaped holder 208 has a vertically disposed depending guide rod 210 which is pivotally connected to a positioning lever 211. The lever 211 is pivoted at one end on a fixed pivot 214 and is held in desired raised or lowered position on a stepped support 212 attached to one of the corner posts of the frame 201.

The cylinder 200 has angle members 207 welded to its sides, each angle member having one end hooked over the frame top (see FIG. 20) and the other end bolted to the opposite frame top. The socket on the ball-holder is threadedly received on the guide rod 210, so when desired, different size ball holders and cylinders may be used, the ball-holder capable of removal and replacement and the cylinder and support bars also removable and replaceable.

With the bagging device shown, a strip of burlap B may be placed in the holder 208 with its edges laid over the edges of the cylinder 206, and when the ball of a tree or bush is placed therein, it will hold the same while the operator fastens the burlap around the trunk of the tree or the neck of the bush being bagged.

With the mechanism that has been hereinbefore described, it can thus be seen that the operation of digging out or balling a bush or tree and burlapping the same by placing the burlap around the ball of earth to maintain the moisture therein, can be easily and simply accomplished. In FIGS. 1 to 4 I have shown the process as carried out in the usual way with the cutter holder disposed at an angle and in FIG. 6 I have shown the way in which the balling of smaller trees or bushes may take place with the cutter head held at a horizontal angle, as when the upper rod of the parallelogram brace is mounted in the hole marked H. In digging out or balling larger trees, it is sometimes necessary, as shown in FIG. 5, to gouge out an opening P adjacent the trunk of a tree, and then move the knife holders and knives around the trunk of the tree and at a lower angle so that a deeper or larger opening P' can be made, resulting in a bigger and deeper ball of earth around the roots of the larger tree.

A copending application Serial No. 179,598, filed March 14, 1962, includes claims to a method covering the inventive concept of the foregoing disclosure.

While I have illustrated and described a specific embodiment of the invention, it will be apparent to those skilled in the art that changes and modifications may be made in the exact details shown, and I do not wish to be limited in any particular; rather what I desire to secure and protect by Letters Patent of the United States is:

1. Apparatus for removing bushes for transplanting, which includes a boom, means to pivotally support said boom at one end, a pair of semi-cylindrical knife holders at the other end of the boom, a pivot adjacent said other end of said boom, one of said knife holders pivoted thereon, means for swinging said knife holder about said pivot to open the ends of said knife holders to permit their movement around the base of a bush, means for closing said knife holders to a circular outline around the base of said bush, semi-circular knives positioned below said knife holders and pivoted at both ends, and means for moving said semi-circular knives downwardly and inwardly about their pivots to cut out a semi-spherical piece of earth.

2. Apparatus for removing bushes for transplanting, which includes a boom, means to pivotally support said boom at one end, a pair of semi-cylindrical knife holders at the other end of the boom, a pivot adjacent said other end of said boom, one of said knife holders pivoted thereon, means for swinging said knife holder about said pivot to open the ends of said knife holders to permit their movement around the base of a bush, means for closing said knife holders to a circular outline around the base of said bush, semi-circular knives positioned below said knife holders and pivoted at both ends, means for moving said semi-circular knives downwardly and inwardly about their pivots to cut out a semi-spherical piece of earth and means for raising said boom and swinging it about a pivot to deposit said piece of earth and bush in a holder.

3. Apparatus for removing bushes or trees for transplanting, which includes a wheeled vehicle, a pivoted boom extending from said vehicle, a pair of semi-circular knife holders at the extended end of said boom, a pivot adjacent the end of said boom, one of said knife holders mounted thereon, means for swinging said knife holder about said pivot to open the ends of said knife holders to permit their movement around the base of a bush, means for moving said pivot to close said knife holders to form a circle and vertically disposed semi-cylindrical knives positioned below said knife holders and pivoted at both ends, and means for moving said knives about their pivots 90° to cut out a semi-spherical piece of earth.

4. Mechanism for balling trees which comprises a support frame for attachment to a wheeled vehicle having a source of hydraulic power thereon, a vertically disposed boom post carried by said support frame, a cutter head, a parallelogram support extending from said boom post to said cutter head, a hydraulic cylinder and piston rod connected between said cutter head and said boom post for raising or lowering said cutter head, a hydraulic cylinder and piston connected between said support frame and boom post for swinging said cutter head in an arc, a pair of knife holders extending forward from said cutter head, semi-cylindrically shaped knives carried by said knife holders and means associated with said cutter head for opening said knives and knife holders to an angle of 180°, and other means associated with said cutter head for swinging said knives in a transverse arc of approximately 90°.

5. Mechanism for balling trees which comprises a support frame for attachment to a wheeled vehicle having a source of hydraulic power thereon, a vertically disposed boom post carried by said support frame, a cutter head, a parallelogram support extending from said boom post to said cutter head, a hydraulic cylinder and piston rod connected between said cutter head and said boom post for raising or lowering said cutter head, a hydraulic cylinder and piston connected between said support frame and boom post for swinging said cutter head in an arc, a pair of knife holders extending forward from said cutter head, semi-cylindrically shaped knives carried by said knife holders and means associated with said cutter head for opening said knives and knife holders to an angle of 180° and other means associated with said cutter head for swinging said knives in a transverse arc of approximately 90°, said cutter head comprising a vertically disposed plate and an auxiliary plate pivotally connected thereto and carrying one of said knife holders.

6. Mechanism for balling trees which comprises a support frame for attachment to a wheeled vehicle having a source of hydraulic power thereon, a vertically disposed boom post carried by said support frame, a cutter head, a parallelogram support extending from said boom post to said cutter head, a hydraulic cylinder and piston rod connected between said cutter head and said boom post for raising or lowering said cutter head, a hydraulic cylinder and piston connected between said support frame and boom post for swinging said cutter head in an arc, a pair of knife holders extending forward from said cutter head, semi-cylindrically shaped knives carried by said knife holders, means associated with said cutter head for opening said knives and knife holders to an angle of 180° and other means associated with said cutter head for swinging said knives in a transverse arc of approximately 90°, said cutter head comprising a vertically disposed plate and an auxiliary plate pivotally connected thereto and carrying one of said knife holders, said auxiliary plate movable to carry one of said knife holders and knives outwardly to open said knives.

7. Mechanism for balling trees which comprises a support frame for attachment to a wheeled vehicle having a source of hydraulic power thereon, a vertically disposed boom post carried by said support frame, a cutter head, a parallelogram support extending from said boom post to said cutter head, a hydraulic cylinder and piston rod connected between said cutter head and said boom post for raising or lowering said cutter head, a hydraulic cylinder and piston connected between said support frame and boom post for swinging said cutter head in an arc, a pair of knife holders extending forward from said cutter head, semi-cylindrically shaped knives carried by said knife holders, means associated with said cutter head for opening said knives and knife holders to an angle of 180° and other means associated with said cutter head for swinging said knives in a transverse arc of approximately 90°, said cutter head comprising a vertically disposed plate and an auxiliary plate pivotally connected thereto and carrying one of said knife holders, said auxiliary plate movable to carry one of said knife holders and knife outwardly to open said knives, said opening means comprising a hydraulic cylinder and piston between said auxiliary plate and said vertical plate.

8. Mechanism for balling and burlapping trees which comprises a support frame for attachment to a wheeled vehicle having a source of hydraulic power thereon, a vertically disposed boom post carried by said support frame, a cutter head, a parallelogram support extending from said boom post to said cutter head, a hydraulic cylinder and piston rod connected between said cutter head and said boom post for raising or lowering said cutter head, a hydraulic cylinder and piston connected between said support frame and boom post for swinging said cutter head in an arc, a pair of knife holders extending forward from said cutter head, semi-cylindrically shaped knives carried by said knife holders, means associated with said cutter head for opening said knives to an angle of 180° and other means associated with said cutter head for swinging said knives in a transverse arc of approximately 90° to cut out and pick up a balled tree, a ball holder support attached to one side of said support frame and a vertically movable ball holding cup in said support, said cutter head being movable into vertical alignment above said ball holding cup.

9. Mechanism for balling and burlapping trees which comprises a support frame for attachment to a wheeled vehicle having a source of hydraulic power thereon, a vertically disposed boom post carried by said support frame, a cutter head, a parallelogram support extending from said boom post to said cutter head, a hydraulic cylinder and piston rod connected between said cutter head and said boom post for raising or lowering said cutter head, a hydraulic cylinder and piston connected between said support frame and boom post for swinging said cutter head in an arc, a pair of knife holders extending forward from said cutter head, semi-cylindrically shaped knives carried by said knife holders, means associated with said cutter head for opening said knives to an angle of 180° and other means associated with said cutter head for swinging said knives in a transverse arc of approximately 90° to cut out and pick up a balled tree, a ball holder support attached to one side of said support frame and a vertically movable ball holding cup in said support over which a burlap cloth may be placed to receive the balled tree so it may be fastened up and around the trunk of said tree, said cutter head being movable into vertical alignment above said ball holding cup.

10. Mechanism for balling trees which comprises a support frame for attachment to a wheeled vehicle, a vertically disposed boom post carried by said support frame, a cutter head, a parallelogram support extending from said boom post to said cutter head, means positioned between the boom post and the cutter head for raising or lowering said cutter head, means associated with said boom post for swinging said cutter head in a horizontal arc, a pair of knife holders extending forward from said cutter head, semi-cylindrically shaped knives carried by said knife holders and means associated with said cutter head for pivotally swinging said knives apart and other means associated with said cutter head for swinging said knives in a downward transverse arc.

11. Mechanism for balling trees which comprises a support frame for attachment to a wheeled vehicle, a vertically disposed boom post carried by said support frame, a cutter head, a parallelogram support extending from said boom post to said cutter head, means positioned between the boom post and the cutter head for raising or lowering said cutter head, means associated with said boom post for swinging said cutter head in a horizontal arc, a pair of knife holders extending forward from said cutter head, semi-cylindrically shaped knives carried by said knife holders and means associated with said cutter head for pivotally swinging said knives apart and other means associated with said cutter head for swinging said knives in a downward transverse arc and holding them in this position while said cutter head is raised and swung away to deposit said balled tree.

12. A cutter head comprising a plate member, an auxiliary plate pivotally mounted on said plate member, an arcuately shaped knife holder connected to each of said plates, an arcuate knife member pivotally connected at both ends of the same in bearings in each of said knife holders and means associated with said plates for swinging said knife holders and knives apart or together to form a circle when closed, and other means associated with said plates for rotating both of said knife members downwardly through an arc of approximately 90°.

13. A cutter head comprising a plate member, a vertically disposed auxiliary plate pivotally mounted on said plate member, a generally horizontally disposed arcuately shaped knife holder connected to each of said plates, an arcuate knife member pivotally connected at both ends of the same in bearings in each of said knife holders and means associated with said plates for swinging said knife holders and knives apart and together to form a circle when closed, and other means associated with said plates for rotating both of said knife members downwardly through an arc of approximately 90°.

14. A cutter head comprising a plate member, a vertically disposed auxiliary plate pivotally mounted on said plate member, a generally horizontally disposed arcuately shaped knife holder connected to each of said plates, an arcuate knife member pivotally connected at both ends of the same in bearings in each of said knife holders and means associated with said plates for swinging said knife holders and knives apart or together to form a circle when closed, and other means associated with said plates for rotating both of said knife members downwardly through an arc of approximately 90°, said means for actuating said knife holders and for rotating said knife members being hydraulically operable cylinders and pistons.

References Cited in the file of this patent
UNITED STATES PATENTS

| | | |
|---|---|---|
| 474,766 | Spofford | May 10, 1892 |
| 594,668 | Wilkens | Nov. 30, 1897 |
| 1,509,994 | Carroll | Sept. 30, 1924 |
| 1,519,344 | Allemeier | Dec. 16, 1924 |
| 1,636,625 | Conrad | July 19, 1927 |
| 2,083,571 | Levandowsky | June 15, 1937 |
| 2,549,476 | Johnson | Apr. 17, 1951 |
| 2,616,220 | Welch | Nov. 4, 1952 |
| 2,652,639 | Kluckhohn | Sept. 22, 1953 |
| 2,755,570 | Blackburn | July 24, 1956 |
| 2,770,076 | Kluckhohn | Nov. 13, 1956 |
| 2,850,842 | Eubank | Sept. 9, 1958 |
| 2,863,258 | Gish | Dec. 9, 1958 |